July 1, 1924.

J. H. MOLLER 1,499,393

CRACKING-OFF DEVICE FOR SHEET GLASS

Filed Nov. 1, 1922

INVENTOR
John H. Moller.
By C. A. Rowley
ATTORNEY

Patented July 1, 1924.

1,499,393

UNITED STATES PATENT OFFICE.

JOHN H. MOLLER, OF CHARLESTON, WEST VIRGINIA, ASSIGNOR TO THE LIBBEY-OWENS SHEET GLASS COMPANY, OF TOLEDO, OHIO, A CORPORATION OF OHIO.

CRACKING-OFF DEVICE FOR SHEET GLASS.

Application filed November 1, 1922. Serial No. 598,428.

*To all whom it may concern:*

Be it known that I, JOHN H. MOLLER, a citizen of the United States, residing at Charleston, in the county of Kanawha and State of West Virginia, have invented new and useful Improvements in Cracking-Off Devices for Sheet Glass, of which the following is a specification.

This invention relates to a cracking-off device for sheet glass, and more particularly to an apparatus of this character to aid in the process of dividing a continuously produced sheet of glass into separate sections as it emerges from the end of the annealing leer.

When sheet glass is produced continuously, and passed through a horizontal leer or annealing oven, it emerges as a continuous strip upon some form of supporting table or conveyor, and is there divided into sections and carried to the cutting rooms. Usually the moving sheet, as it is carried along upon the table or conveyor is scored transversely with some form of hand-operated cutting tool, and the sheet is then slightly elevated, from beneath, adjacent the scored line, so that it will crack or fracture along this line. Since the operator who scores the sheet stands at one side of the moving sheet, he will usually elevate the sheet by grasping the nearest edge portion only. This causes uneven bending strains in the sheet, and if the scored line is unevenly made, or there are unequal internal stresses in the sheet, the line of fracture may not follow the scored line across the width of the sheet, but diverge therefrom, thus causing considerable waste.

The object of the present invention is to provide a device, whereby the operator from his station at one side of the sheet, may elevate the sheet equally across its entire width at the scored line, thus securing a clean even break. The apparatus comprises means for simultaneously engaging the sheet from beneath at a plurality of spaced points across the width of the sheet, this means being mounted on a carriage movable to different positions beneath the sheet so that the apparatus can be readily placed beneath the moving score line. The objects and advantages of the invention will be better understood from the following detailed description of one approved form of the apparatus.

Figure 2:
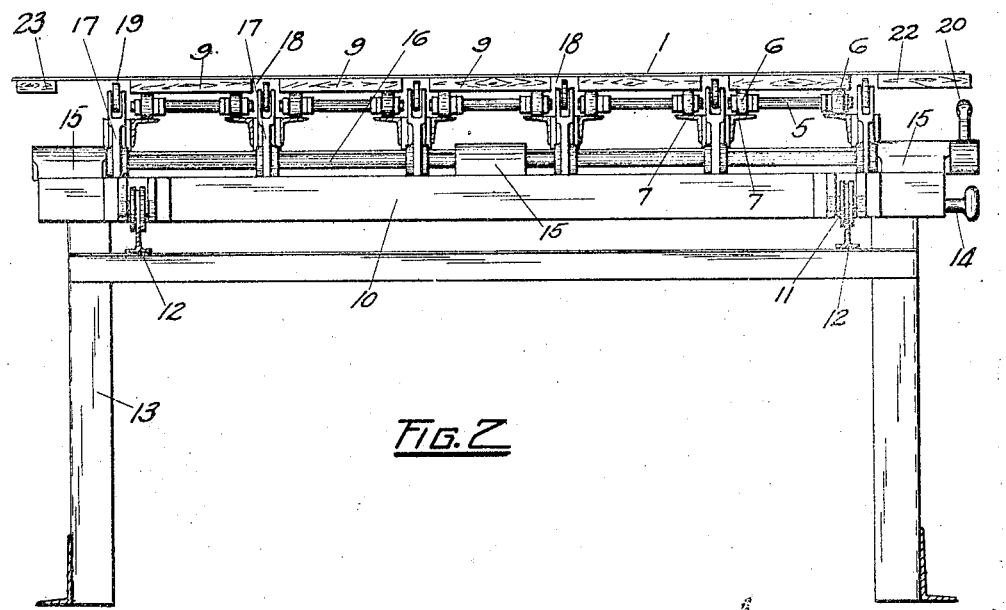
Fig. 2 is a vertical transverse section taken substantially on the line 2—2 of Fig. 1, showing the cracking-off device in side elevation.

The continuous sheet of glass 1 passes from its source through the annealing oven or leer 2 in which it is carried and supported on any suitable type of conveyor, usually a series of driven rollers. The sheet after emerging from the leer, is supported upon the cutting-table or conveyor 3 which moves in the same direction and at the same rate of speed as the glass sheet 1. This table may be made in a variety of forms, but it is here shown as consisting of a series of separate spaced supporting strips, each in the form of an endless sprocket chain, the links 4 being joined by pintles 5 which carry rollers 6 at their ends. During the upper horizontal run of the chains, these rollers travel upon the horizontal supporting rails 7. The chain loops pass around a suitable supporting and guiding wheel or roller 8 at the end adjacent to the leer, and at the other end (not shown) the chain loops pass around and are driven by a series of sprockets all mounted on the same driving shaft. The outer face of each chain link 4 carries a wooden block 9, the glass sheet being supported on these wooden blocks, which in the upper horizontal run of the table or conveyor have their sheet-supporting surfaces in the same horizontal plane.

A carriage 10 is mounted by means of grooved supporting wheels 11 upon rails 12 beneath the upper run of the conveyor 3. The rails 12 are mounted parallel to the rails 7 on the same supporting frame work 13. Consequently, when the carriage 10 is shifted back and forth along rails 12 by means of a suitable handle or knob 14 at one end of the carriage, its line of travel will be parallel to that of the glass sheet 1.

Figure 1:
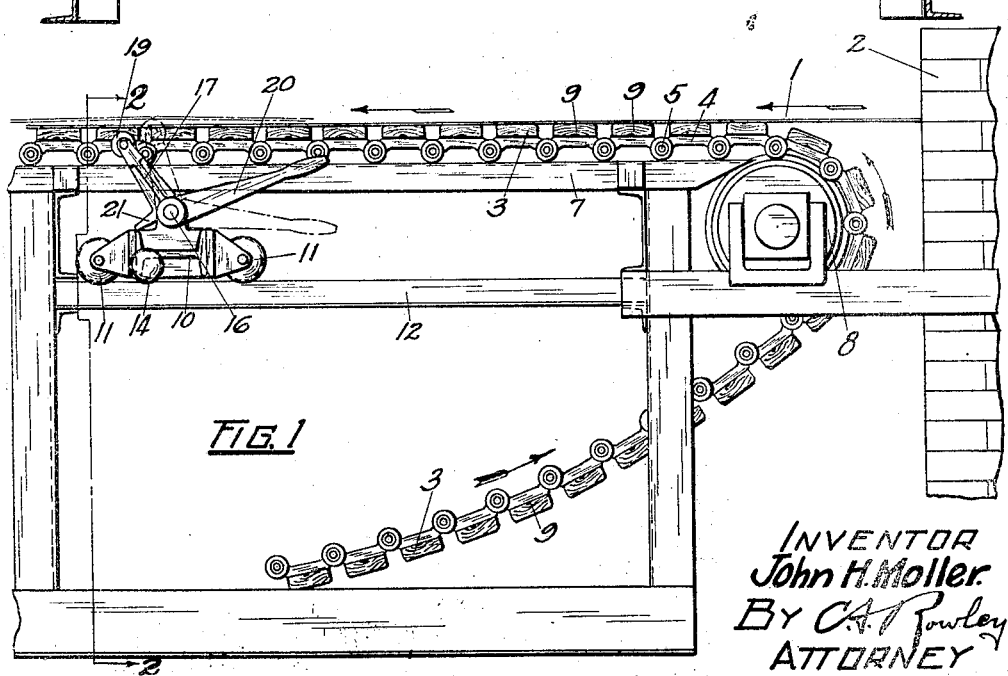
Fig. 1 is a side elevation of one end of the conveying table, showing the cracking-off device in end elevation.

Pivoted in suitable bearings 15 on carriage 10, is a horizontal shaft 16. On this shaft are fixed a series of arms 17 spaced to correspond with the openings 18 between the several strips or sections of the conveyor 3. The arms 17 are all mounted in the same radial plane passing through the axis of shaft 16 and each arm carries a roller 19 at its outer end. A hand lever 20 is fixed to one end of shaft 16, preferably at the same end of the carriage as the shifting knob or handle 14. The combined weights of the several arms 17 will be greater than the weight of hand lever 20 so that normally the arms 17 will fall back to the position indicated in full lines in Fig. 1, their movement being arrested by the engagement of lug 21 with the carriage 10.

In operation, the cutter, who stands at the right-hand side of the machine as seen in Fig. 2, will draw a scoring tool transversely across the sheet 1 where a cut is to be made. As the scored sheet moves along on conveyor 3, the operator will grasp knob 14 and shift carriage 10 until the rollers 19 are positioned beneath the traveling score line. He will then depress the hand lever 20 to the position indicated in dotted lines in Fig. 1, which will simultaneously elevate the series of rollers 19 into engagement with the lower side of the sheet, elevating the same evenly and equally across its entire width. This will cause the sheet to crack off along the scored line, after which the lever 20 is released and arms 17 and rollers 19 will fall back into normal position out of engagement with the sheet of glass. When the next succeeding score line is made, the carriage 10 will be shifted beneath the line and the operation repeated. Obviously, if found desirable, two or more of these cracking-off units may be positioned at spaced intervals beneath the same table or conveyor. In this way the cracking-off operation may be performed at widely separated points without necessitating an excessive movement of carriage 10.

In the construction illustrated in Fig. 2, the edge portions of the sheet are supported, and slide on, stationary wooden rails 22 and 23 at the sides of the conveyor. These act as guard-rails, and are for the convenience of the operator while trimming off the edge portions of the sheet, but are not essential features of the invention here disclosed and may be omitted. The rail 22 is not shown in Fig. 1.

Claims:

1. The combination with a table on which sheet glass is supported while being scored, of a cracking-off device movable to different positions beneath the table and sheet to elevate the sheet at the score line.

2. The combination with a table on which sheet glass is supported while being scored, of a cracking-off device comprising a carriage movable under the sheet to position beneath the score line, and means on the carriage for elevating the sheet.

3. The combination with a table on which sheet glass is supported while being scored, consisting of a series of spaced parallel strips, of a cracking-off device comprising a carriage movable under the sheet to position beneath the score line, a shaft pivoted transversely of the table, means for oscillating the shaft, and a series of arms fixed to the shaft for engaging the sheet between the supporting strips and elevating it at the score line.

4. The combination with a moving table or conveyor on which the glass sheet is carried while being scored, of a cracking-off device movable to position beneath the score line and comprising means to elevate the sheet.

5. The combination with a moving table or conveyor on which the glass sheet is carried while being scored, of a cracking-off device comprising a carriage movable under the sheet and conveyor to position beneath the score line, and means on the carriage for elevating the sheet at this point.

6. The combination with a moving table or conveyor on which the glass sheet is carried while being scored, of a cracking-off device comprising a carriage movable under the sheet and conveyor to position beneath the score line, a shaft pivoted transversely of the carriage, means for oscillating the shaft, and a series of arms fixed to the shaft for engaging the sheet from beneath to elevate it at the score line.

7. The combination with a moving table or conveyor on which the glass sheet is carried while being scored, of a cracking-off device comprising a carriage movable under the sheet and conveyor to position beneath the score line, a shaft pivoted transversely of the carriage, means for oscillating the shaft, a series of arms fixed to the shaft, and rollers at the ends of the arms for engaging and elevating the sheet at the score line.

8. The combination with a moving table or conveyor on which the glass sheet is carried while being scored, consisting of a series of spaced parallel sheet supporting strips, of a cracking-off device comprising a carriage movable under the sheet and conveyor to position beneath the score line, a shaft pivoted transversely of the carriage, means for oscillating the shaft, and a series of arms fixed to the shaft for engaging the sheet between the supporting strips to elevate it at the score line.

9. The combination with a moving table or conveyor on which the glass sheet is carried while being scored, consisting of a series of spaced parallel sheet supporting strips, of a cracking-off device comprising a carriage movable under the sheet and conveyor to position beneath the score line, a shaft pivoted transversely of the carriage, means for oscillating the shaft, a series of arms fixed to the shaft between and beneath the sheet supporting strips, and rollers at the ends of the arms for engaging and elevating the sheet at the score line.

Signed at Charleston, in the county of Kanawha, and State of West Virginia, this 26th day of October, 1922.

JOHN H. MOLLER.